United States Patent [19]

Mominee et al.

[11] 4,018,459
[45] Apr. 19, 1977

[54] SUBMAIN CONNECTOR

[75] Inventors: David E. Mominee, Covina; Gilbert W. Vance, El Monte, both of Calif.

[73] Assignee: Reed Irrigation Systems, El Monte, Calif.

[22] Filed: July 30, 1975

[21] Appl. No.: 600,469

[52] U.S. Cl. .................................. 285/5; 285/39; 285/93; 285/200; 285/208; 285/DIG. 22

[51] Int. Cl.² .......................................... F16L 41/00

[58] Field of Search .......... 239/547, 542, 271, 272; 285/208, 209, 210, 200, 162, 197, DIG. 22, 5, 6, 39

[56] References Cited

UNITED STATES PATENTS

| 1,342,825 | 6/1920 | Saucke | 285/210 |
| 1,527,831 | 2/1925 | Borgner | 285/200 X |
| 1,804,742 | 5/1931 | Campbell | 239/547 |
| 2,145,451 | 1/1939 | McCoy | 239/547 |
| 2,721,764 | 10/1955 | Wilson | 239/547 X |
| 3,753,527 | 8/1973 | Galbraith et al. | 239/547 X |

FOREIGN PATENTS OR APPLICATIONS

| 107,066 | 6/1927 | Austria | 285/200 |
| 1,049,527 | 11/1966 | United Kingdom | 285/197 |

Primary Examiner—Thomas F. Callaghan
Attorney, Agent, or Firm—Gordon L. Peterson

[57] ABSTRACT

A connector for use with flexible tubing comprising first and second coupling sections. The first coupling section has a head and a shank with the head being adapted to be forced through an opening in the wall of the tubing. The second coupling section has a shoulder and can be attached to the first coupling section so that the head and the shoulder clamp a region of the wall of the tubing to provide a strong mechanical connection and a substantially fluid tight connection between the connector and the tubing.

1 Claim, 6 Drawing Figures

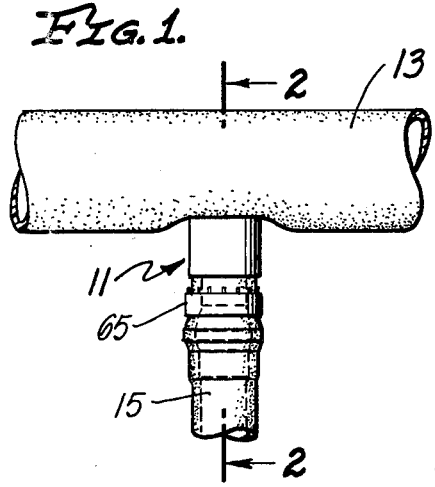
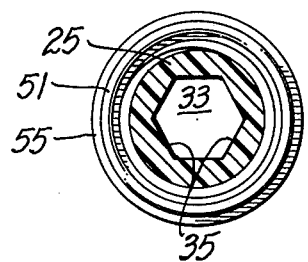
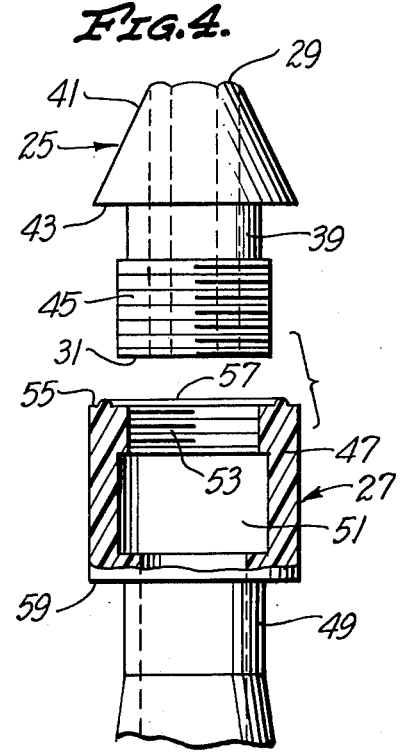
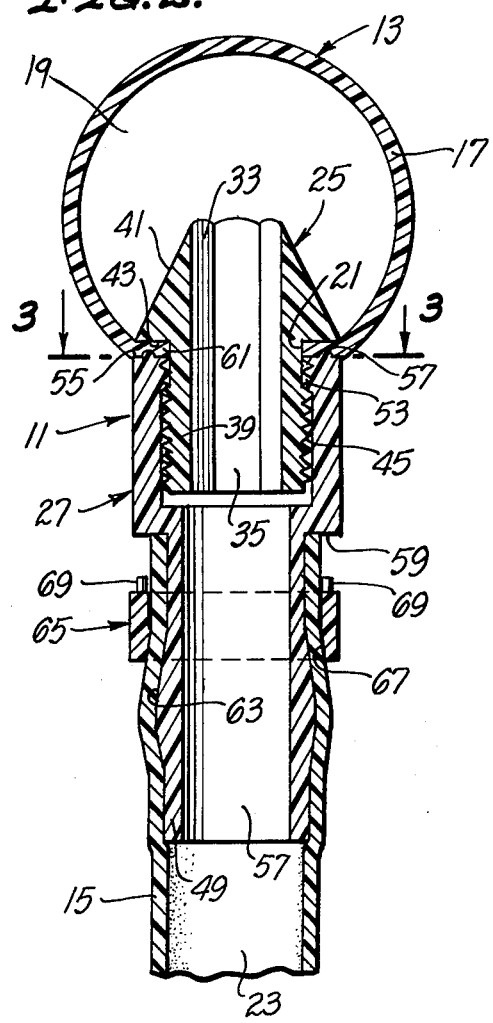
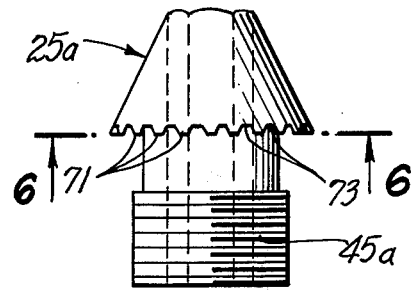
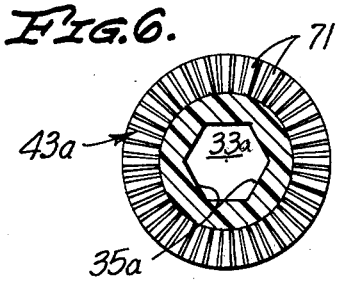

SUBMAIN CONNECTOR

BACKGROUND OF THE INVENTION

In drip irrigation, it is common practice to use rather rigid plastic tubing for the main header and the submain header of the water distribution system. Connectors are used to couple the submain headers to the main header. Each of the connectors typically includes a barb which is forced through an opening in the wall of the main header. The barb is larger than the opening so that it cannot be withdrawn.

One disadvantage of this prior art connector is that it cannot be successfully used with tubing having a flexible wall. Specifically, the prior art connector causes leakage, and it wobbles on the main header. Thus, neither the fluid connection nor the mechanical connection is satisfactory.

Although other means can be used to interconnect flexible wall tubing, such means is characteristically too expensive to be commercially feasible. As a result, flexible wall tubing has not received acceptance for use as main headers or submain headers. This is unfortunate because flexible wall tubing is less expensive than the relatively rigid wall tubing. In addition, flexible wall tubing is more durable in that it can be run over by vehicles without being damaged.

SUMMARY OF THE INVENTION

The present invention provides a novel and inexpensive connector which can be used to couple tubing having rigid or flexible walls. Accordingly, the connector of this invention enables the less expensive and more durable flexible wall tubing to be used for main and submain headers. Thus, the connector of this invention has substantial advantageous effect on the system with which the connector is used.

To provide good fluid and mechanical connections, the connector of this invention tightly clamps a region of the wall of the tubing to which it is attached. This can be advantageously accomplished by providing a connector which includes first and second coupling sections with the first coupling section having a head and a shank. The material of the wall of the tubing around the opening is stretchable to permit the head to be forced through the opening and into the passage of the tubing. The shank extends through the opening to the exterior of the tubing.

The second coupling section has a shoulder adjacent the conduit. The coupling sections are mounted for movement relative to each other to relatively advance the head and shoulder toward each other to clamp a region of the wall of the tubing between the head and the shoulder. This clamping action tightly mechanically attaches the connector to the tubing and provides a substantially fluid tight connection.

The means for relatively advancing the two coupling sections can advantageously include screw threads. In order that the shoulder of the second coupling section can be exposed to clamp the wall of the tubing, the second coupling section is preferably internally threaded and the shank of the first coupling section has external screw threads.

To install the connector on the tubing, the coupling sections are interconnected with the shoulder and head being separated. The head is then forced through the opening in the tubing. To facilitate the insertion of the head, the head preferably has a tapered peripheral surface. In order that the connector can transmit fluid, each of the coupling sections has axially extending passages which are in communication when the connectors are assembled on the tubing.

With the head inside the tubing, it is then necessary to relatively rotate the coupling sections to bring the shoulder and the head into clamping relationship with the wall of the tubing. This could be a very difficult task because the first coupling section is substantially encased by the tubing and the second coupling section. However, the present invention facilitates tightening of the threads in two different ways. First, the passage through the first coupling section is defined by an internal surface which also may define one or more wrench flats. This permits a wrench to be inserted through the passage of the second coupling section into the passage of the first coupling section to tighten the threads. Alternatively, or in addition to the wrench flats, the regions of the head and/or shank which engage the wall of the tubing may be provided with a surface irregularity to grip the tubing. This also facilitates tightening of the threads and inhibits relative rotation of the assembled connector relative to the tubing.

The shoulder on the second coupling section may be provided with means for causing a tighter engagement between the shoulder and the wall of the tubing and to improve the sealing effectiveness of the connector. Such means may include a surface irregularity such as a circumferentially extending rib. As the threads are tightened, the rib "bites into" the wall of the tubing to provide a secure connection.

The invention can best be understood by reference to the following description taken in connection with the accompanying illustrative drawing.

BRIEF DESCRIPTION OF THE DRAWINGS

FIG. 1 is a plan view of a connector constructed in accordance with the teachings of this invention with the connector interconnecting two fluid carrying conduits.

FIG. 2 is an enlarged fragmentary sectional view taken generally along line 2—2 of FIG. 1.

FIG. 3 is a sectional view taken generally along line 3—3 of FIG. 2.

FIG. 4 is a fragmentary exploded plan view of the connector.

FIG. 5 is a plan view showing a modified form of one of the coupling sections.

FIG. 6 is a sectional view taken generally along line 6—6 of FIG. 5.

DESCRIPTION OF THE PREFERRED EMBODIMENTS

FIG. 1 shows a connector 11 constructed in accordance with the teachings of this invention with the connector being utilized to connect a main header 13 and a submain header 15 of an irrigation system such as a drip irrigation system. The connector 11 can be used to interconnect various different kinds of fluid carrying conduits and the main header 13 and the submain header 15 are merely illustrative.

With reference to FIG. 2, the main header 13 has a wall 17 which defines a fluid passage 19 of generally circular cross sectional configuration. The wall 17 has an opening 21 which may be of circular cross configuration. The wall 17 may be either flexible or rigid. However, in the embodiment illustrated, the wall 17 is flexible and is constructed of material suitable for making flexible tubing such as polyethylene rubber. The wall 17 is also relatively thin as is customary for flexible plastic tubing.

The submain header 15 in the embodiment illustrated is also in the form of plastic tubing, and it may be either flexible or rigid. The submain header 15 has a fluid passage 23 which is of smaller diameter than the passage 19.

The connector 11 includes coupling sections 25 and 27 (FIGS. 2 and 4) each of which may be constructed of rigid plastic material such as high density polyethylene or polypropylene. The coupling section 25 has an inner end 29, an outer end 31, and an internal surface defining an axial passage 33 which extends completely through the coupling section 25 from the inner end 29 to the outer end 31. The internal surface which defines the passage 33 also defines wrench flats 35 (FIG. 3) which extend completely through the passage 33. Although different configurations can be used, in the embodiment illustrated there are six wrench flats 35 which render the passage 33 hexagonal and convert it into a socket for receiving a wrench, such as an Allen wrench.

The coupling section 25 has a head 37 and a shank 39. The head 37 has an inclined peripheral surface 41 which tapers radially inwardly as it extends toward the inner end 29. In the embodiment illustrated, the peripheral surface 41 is frustoconical. The head 37 also defines a shoulder 43 at the juncture of the head and the shank 39. In the embodiment illustrated, the shoulder 43 is annular and lies in a plane which is perpendicular to the axis of the passage 33. The shank 39 has external screw threads 45.

The coupling section 27 has a socket 47, a stem 49, and an axial passage 51 which extends completely through the coupling section 27. The socket 47 has internal screw threads 53 sized to mate with and receive the threads 45 on the shank 39. The coupling section 27 terminates in a shoulder or end face 55 of annular configuration. The coupling section 27 has an integral annular rib 57 projecting axially outwardly from the end face 55. The socket 47 is of larger cross sectional area than the stem 49 and a shoulder 59 is formed at the juncture of the stem and socket.

In use of the connector 11, the coupling sections 25 and 27 are threadedly interconnected with the shoulder 43 being spaced substantially from the end face 55. Using the stem 49 as a handle, the head 37 is forced through the opening 21 with the inclined peripheral surface 41 facilitating such insertion. Although the cross sectional dimensions of the head 37 at the shoulder 43 are greater than the dimensions of the opening 21, the material of the wall 17 around the opening is stretchable to permit the head to be inserted into the passage 19.

Next a wrench (not shown), such as an Allen wrench is inserted through the passage 51 into the passage 33. The threads 45 and 53 are then tightened using the wrench. The tightening of the threads 45 and 53 relatively axially advances the shoulder 43 and the end face 55 toward each other and into clamping engagement with an annular region 61 of the wall 17 surrounding the opening 21. As the shoulder 43 and the end face 55 move toward each other, the rib 57 contacts the region 61 and further tightening of the threads 45 and 53 causes the rib 57 to tightly bite into the region 61. By tightly clamping the region 61 between the shoulder 43 and the end face 55, a strong mechanical connection is provided. In addition, the connection between the connector 11 and the main header 13 is made fluid tight.

The coupling section 27 can be attached to the submain header 15 in any suitable manner and the arrangement shown in FIG. 2 is purely illustrative. As shown in FIG. 2, the stem 49 has an external ramp 63 of frustoconical configuration and a tubular fitting 65 is sized to receive the stem 49. The fitting 65 has an internal frustoconical ramp 67 and a plurality of projections 69.

One end of the header 15 is slid over the stem 49 as shown in FIG. 2. During this time the projection 69 spaces the main body portion of the fitting 65 axially of the shoulder 59 so that the user can visually observe when the end of the header 15 contacts the shoulder 59. The fitting 65 is then slid downwardly as viewed in FIG. 2 to tightly clamp a region of the header 15 between the ramps 63 and 67 to thereby connect the header 15 to the connector 11.

FIGS. 5 and 6 show a coupling section 25a which is identical to the coupling section 25 in all respects not shown or described herein. Portions of the coupling section 25a corresponding to portions of the coupling section 25 are designated by corresponding reference numerals followed by the letter a.

The only difference between the coupling sections 25a and 25 is that the former has surface irregularities on the shoulder 43a. In the embodiment illustrated, the surface irregularities are in the form of radially extending teeth 71 circumferentially spaced by grooves 73.

The coupling section 25a can be used with the coupling section 27 in the same manner as shown in FIG. 2 for the coupling section 25. The teeth 71 are adapted to cooperate with the region 61 to resist rotation of the coupling section 25a relative to the wall 17 when the threads 45a and 53 are being tightened. In the installed condition, the teeth 71 further act to increase the strength of the mechanical connection between the connector and the wall 17. The wrench flats 35a can be eliminated if desired.

Although exemplary embodiments of the invention have been shown and described, many changes, modifications and substitutions may be made by those with ordinary skill in the art without necessarily departing from the spirit and scope of this invention.

We claim:
1. An assembly comprising:
a first flexible header having a wall and a passage, said passage being adapted to have fluid therein, said wall having an opening providing access to said passage;
first and second coupling sections of plastic material;
said first coupling section having inner and outer ends, a head adjacent the inner end, a shank extending from the head toward the outer end, and an internal surface defining an axially extending passage extending completely through said first coupling section from the inner end to the outer end;
said internal surface of said first coupling section defining at least one wrench flat whereby the first coupling section can be driven by a wrench;
said head having a peripheral surface which tapers radially inwardly as it extends toward said inner end and an annular shoulder adjacent the juncture of the head and the shank, said shoulder lying in a plane which is perpendicular to the axis of said passage;

a plurality of radially extending teeth on said shoulder, said teeth extending from said shank radially outwardly to the periphery of said head whereby the teeth extend for the full radial width of said shoulder;

said shank having external screw threads thereon, said threads being spaced from said shoulder to define an unthreaded portion of said shank;

the material of the wall of said first header around the opening being stretchable to permit the head to be forced through the opening and into the passage of the first header; said shank extending through said opening to the exterior of the first header with the opening surrounding said unthreaded portion;

a second coupling section of plastic material having an axially extending passage extending completely through the second coupling section, said second coupling section terminating at one end in an end face;

internal screw threads in said passage of said second coupling section adjacent said one end threof whereby the coupling sections can be attached with the shank at least partially received within the passage of the second coupling section, with said passages being in communication, and with a region of the wall around the opening in the first header being clamped between the end face and the shoulder whereby the coupling sections can be mounted on the first header in substantially fluid tight relationship therewith, said end face and said shoulder having approximately the same radial width and said teeth gripping said region of the wall;

said outer end terminating within said passage of said second coupling section and said second coupling section extending axially beyond said outer end of said first coupling section;

a second header having a passage;

tubular means cooperable with said second coupling section for attaching said second header to the second coupling section; and said passages of said coupling sections providing communication between the passages of said headers.

* * * * *